United States Patent [19]
Riggs

[11] 3,717,873
[45] Feb. 20, 1973

[54] SHIP'S MANEUVER ASSESSMENT SYSTEM
[75] Inventor: Robert F. Riggs, Charlottesville, Va.
[73] Assignee: Sperry Rand Corporation
[22] Filed: Nov. 5, 1970
[21] Appl. No.: 87,025

[52] U.S. Cl. ................343/5 EM, 343/112 CA
[51] Int. Cl. ................................G01s 7/22
[58] Field of Search ............343/5 EM, 112 CA

[56] References Cited
UNITED STATES PATENTS

| | | | |
|---|---|---|---|
| 3,188,631 | 6/1965 | Birtley | 343/5 EM |
| 2,603,775 | 7/1952 | Chipp | 343/5 EM |
| 3,307,177 | 2/1967 | Novak | 343/5 EM |
| 3,355,733 | 11/1967 | Mitchell et al. | 343/5 EM |

Primary Examiner—Benjamin A. Borchelt
Assistant Examiner—G. E. Montone
Attorney—S. C. Yeaton

[57] ABSTRACT

A ship's maneuver assessment system is provided as a radar system accessory for permitting identification of intruding ships that demonstrate collision threat characteristics and for the generation of a maneuver assessment display providing the ship's operator with an evaluation of possible maneuvers for avoiding collision with such intruding vessels.

8 Claims, 4 Drawing Figures

INVENTOR
ROBERT F. RIGGS
BY
ATTORNEY

INVENTOR
ROBERT F. RIGGS
BY
HP Terry
ATTORNEY

SHIP'S MANEUVER ASSESSMENT SYSTEM

BACKGROUND OF THE INVENTION

1. Field of the Invention

The invention pertains to radio means for early warning and assessment of potential collision between moving vehicles and more particularly relates to means adaptable for use with azimuth scanning radar systems or the like for generating cooperating displays, one providing a readily interpretable presentation of factors indicating collision possibilities and a second providing a quickly and accurately interpretable display for assessing consequent ship maneuvers designed safely to eliminate the collision possibility.

2. Description of the Prior Art

Radio and other aids to marine navigation have been employed in the past for augmenting the lookout's ability visually to determine potential collisions between marine vessels. Radar systems and similar sensors have been used to determine the bearing rate and range data corresponding to a selected intruder vessel. However, the detection of small bearing rates at large ranges does not lend itself to accurate instrumentation, since small errors between successive bearing readings destroy the accuracy of prediction of the closest point of approach of the intruding vessel.

Collision warning techniques often employ measurement of passing distance at closest point of approach. In such a system, radar indicators, reflection plotters, and plotting tables are often used. However, errors of plotting can seriously degrade the reliability of these methods. Generally, a single operator cannot accurately plot the data and assess from it the degree of danger attached to as few as three intruding targets simultaneously. Semi-automatic transfer of radar to plotting boards has been attempted, but the instrumentation is expensive. Also proposed have been quite expensive though more accurate photographic plotting systems; in these photographic systems, few errors can be introduced by the operator.

Typical collision warning systems of the above described type do not in a fully accurate or rapid manner furnish data directly usable in reliably assessing what maneuver own ship must make in order effectively to avoid an impending collision. The ship's operator must, upon observation of a collision potential, apply various rules and customs such as the International Rules of the Road and the Inland Rules of the Road which have been devised to prevent collisions. The Steering and Sailing Rules must also be followed when there is risk of collision. It is left to the ship's operator after the warning of an impending collision to exercise a difficult judgment as to what maneuver he must order the ship to make so as to remove the risk of collision. The required space for a safe maneuver depends upon knowledge of many factors, such as knowledge of the intruding vessel's class, speed, intention, and heading. Adverse wind and sea states can be influential in causing erroneous maneuvers leading to disaster rather than to evasion.

SUMMARY OF THE INVENTION

The invention is a collision avoidance and maneuver assessment aid for marine vessels of the type employing a radar plan position display generated by an azimuth scanning radar unit. A novel system first warns of intruding vessels and determines which are threats, such as by employing the tau collision avoidance criterion. The parameters of closing-range targets, when such targets are identified as dangerous, are selectively transferred in order of hazard level to track-while-scan apparatus for coordinate storage and coordinate rate generation. The stored data, when extracted from the track-while-scan unit, is modified for inertial stabilization and other purposes and is employed to generate a synthetic cathode ray display for maneuver assessment. The particular synthetic display and a novel symbol graphically representing the target or hazard ship's history permit accurate and rapid judgment by an observer of permissible maneuvers by which the ship may avoid the collision possibility.

The maneuver assessment display indicates points of probable collision, rather than closest point of approach between own ship and an intruding vessel, and displays a calculated area of uncertainty about each point of probable collision. All points of probable collision are displayed simultaneously for recognized intruders entered into the assessment system, all intruding target's present positions and predicted tracks to their associated points of probable collision also being presented. Thus, true headings for each such intruder are readily observed, permitting ready compliance with the established rules of the road. The display of area of uncertainty also permits the operator to choose a safe heading without trial headings or guess-work.

DESCRIPTION OF THE PREFERRED EMBODIMENT

Figure 1:
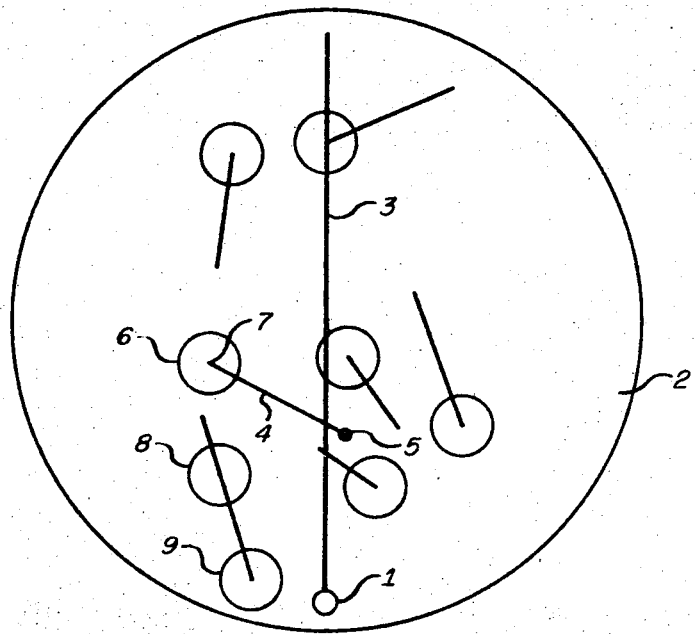
FIG. 1 is a plan view of the screen of a cathode ray tube showing symbols used in the display of the present invention.

The collision avoidance and collision assessment apparatus of the present invention provides a synthetic display normally generated by a cathode ray tube indicator and designed to present to the viewer all information needed for performing an effective maneuver whenever risk of collision with an intruding ship is established. The display, as indicated in FIG. 1, is by way of example an offset type P display, representing the position of own ship at the location 1 near the bottom of the indicator screen 2. A heading flash cursor 3 is normally directed vertically or across screen 2 in the presentation, being formed by a conventional heading flasher circuit so as to extend from location 1 substantially to the opposite side of screen 2. The heading cursor 3 thus represents the future track of own ship unless own ship's course is to be disturbed.

Other indications formed of straight lines and circles appear on the screen 2 of FIG. 1. Each represents characteristics of ships in the locality of own ship; for example, the end 5 of line 4 represents the present position of a target ship which might be regarded as an intruder. The straight line 4 indicates the intruding target's future track. As will be further described, the circle 6 formed about the end 7 of future track 4 represents a locale of possible collision between the vessel now at position 5 and own ship. Each such region of possible collision represents an area of uncertainty as to the exact location of the end 7 of target's future track 4. It is seen that the intruding vessel's heading is represented by the direction of the target's future track line 4. Relative speed between the intruder and own ship 1 is represented by the ratio of the length of the predicted track 4 to own ship's range to the region of possible collision. In some circumstances, such as represented by circles 8 and 9 as when the hazard is overtaking own ship, there may be two regions of possible collision.

Figure 3:
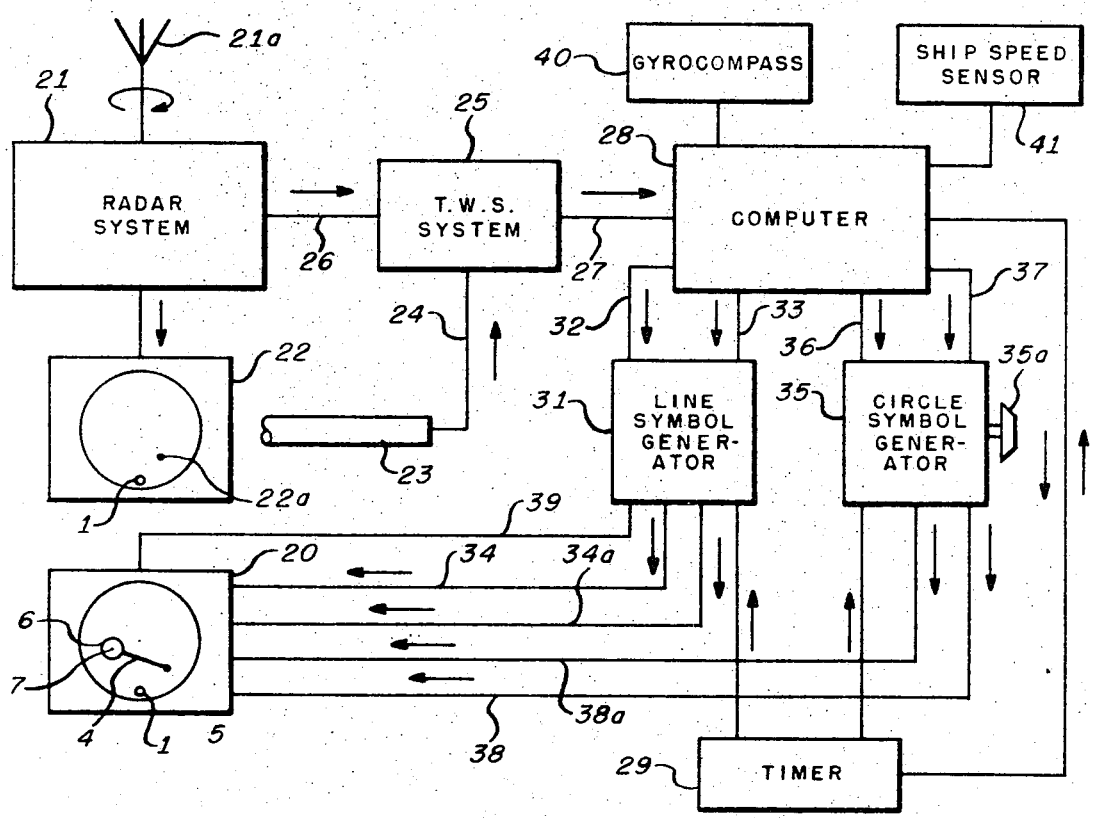
FIG. 3 is a block diagram illustrating one embodiment of the invention.

It is to be understood that other symbols may be added to the display indicated in FIG. 1. For example, a transparent map display showing fixed hazards such as land masses may be superimposed over screen 2 and may be automatically moved relative to screen 2 in time with own ship's apparent motion along the heading cursor 3, using data, for instance, from gyrocompass 40 and ship's speed sensor 41 as shown in FIG. 3. Video superposition of such symbols as appear on a data chart may be added by a flying spot scanner, permitting the display and ready identification of both fixed and moving hazards on a single display. Furthermore, if a minimum passing distance at the closest point of approach by the vessels 1 and 5 is desired, for example, the circular symbol 6 may be enlarged so that its radius represents the sum of the selected minimum passing distance value and the calculated uncertainty in the position of possible collision.

It will be clear to those skilled in the cathode ray display art that any of several well known approaches may be used in tracing symbols on the face 2 of the cathode ray tube. Type P scansion or raster scansion of the electron beam may be employed within the scope of the invention, each symbol being drawn by intensification of the electron beam as it is deflected across the locus of the symbol. It is furthermore apparent to one skilled in the art that symbols may be drawn by well known means during the fly-back or re-trace time between each such electron beam deflection, for example, by one or by a series of deflections of the intensified beam during the fly-back time in a raster scanning system. Such methods are well known in the art, as also are methods in which the regular polar or raster scanning of the intensified electron beam is not used. In such apparatus, symbols are generated by forming a programmed series of deflection strokes to form a symbol.

Figure 2A:
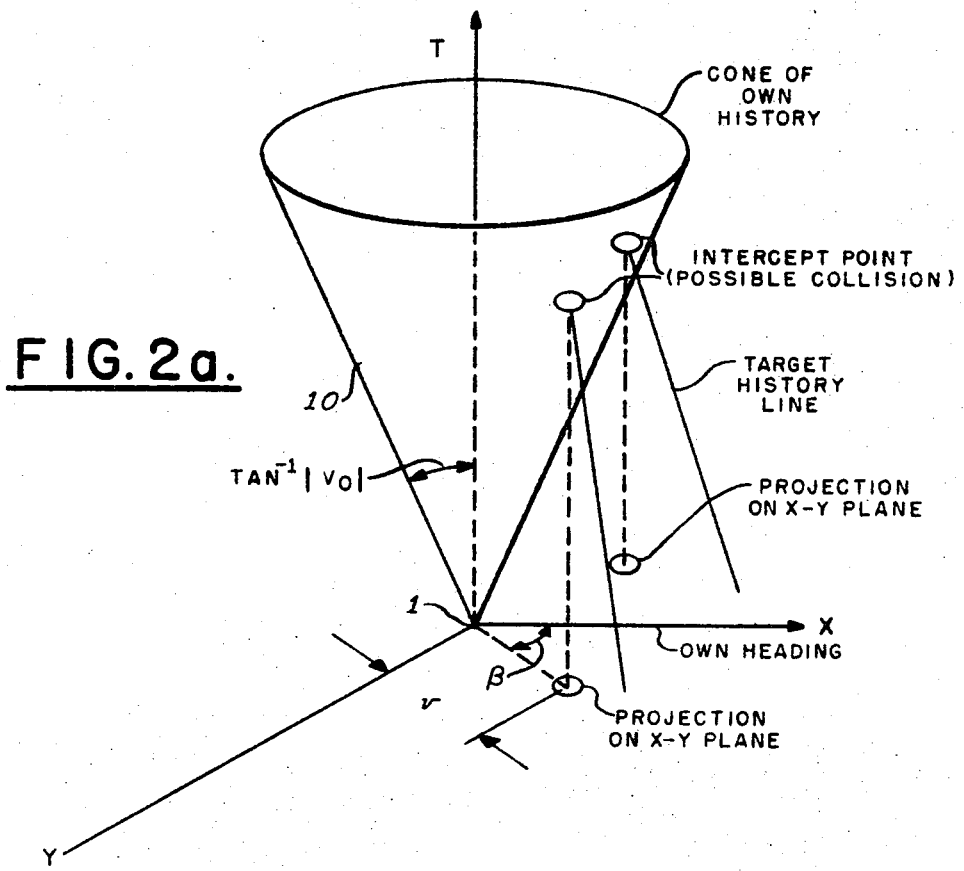
FIGS. 2a and 2b are respectively three- and two-dimensional graphic representations useful in explaining the theory of operation of the invention.
Figure 2B:
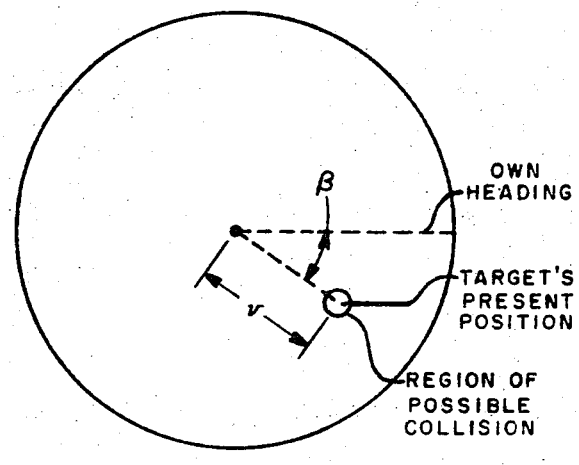

The concepts and the principles to be employed in producing the display of FIG. 1 may be visualized by inspection of the three dimensional representation shown in FIGS. 2a and 2b. In FIG. 2a, an X—Y plane is provided that represents the surface of the earth. Accordingly, movable ships and fixed hazards such as land masses all occupy positions on the X—Y plane. The passage of time in the events involving own ship and intruding vessels is represented by the vertical axis T. This behavior as a function of time, which may be spoken of as the ship's history, may be represented by a straight line suitably oriented in the three dimensional space X—Y—T. Own ship's position is again represented at location 1 which is the origin of the X—Y—T coordinate pattern. The location 1 corresponds in position and instantaneous time to the location 1 on the screen 2 of FIG. 1.

It will be assumed, by way of example and without loss in generality, that own ship 1 is moving in the X—T plane of FIG. 2a at some fixed speed $V_o$. The angle that own ship's history line 10 makes with the time axis T is then $\tan^{-1}|V_o|$. In the coordinate system of FIG. 2a, a collision between own ship and an intruder ship will occur if own ship's history line, such as line 10, intercepts the history line of any other ship. If own ship elects to make a course change maneuver such as an evasive maneuver without changing speed, own ship's history line will continue to lie on the cone of own ship's history, which is defined by using line 10 by revolving it about the time axis T so as to generate a cone having an apex angle $2\tan^{-1}|V_o|$. At any location at which some other ship's history line intercepts the cone of own ship's history, the intercept between the other ship's history line and the cone of own ship's history represents a point of probable collision.

In implementing the solution of equations which follow from the geometry of FIGS. 2a and 2b, it will be understood that a variety of types of known sensor, computer, and symbol generator devices may be successively employed. In particular, the computer so employed must solve simultaneous equations representing the cone of own ship's history and the target history line or at least a history line representing the best available estimate of the target's history line. The angle of the hazard's history line with respect to the vertical axis is $\tan^{-1}|V_T|$, where $|V_T|$ is the best estimate of the target's speed. The projection of the three dimensional figure shown in FIG. 2a on the planar representation of FIG. 2b is seen to be similar to the display for a representative hazard vessel as discussed in connection with FIG. 1. For example, the projection of the target or hazard history line onto the X—Y plane corresponds in FIG. 2b to be the target's future track with the direction of that track representing the heading of the intruding vessel.

To illustrate the general problem of simultaneous solution to be solved by the system computer, it is seen that the cone of own ship's history of FIG. 2a may be represented by:

$$x^2 + y^2 = V_o^2 t^2 \quad (1)$$

Since the target's future track may justifiably be assumed to be substantially its history line, that line representing the target's future track may be designated in terms of X and Y coordinate positions and coordinate rates by the set of equations:

$$x_T = x_{OT} + \dot{x}_T t \quad (2)$$

$$y_T = y_{OT} + \dot{y}_T t \quad (3)$$

where $x_{OT}, y_{OT}$ are present position coordinates of the intruder or hazard in the X—Y (earth) plane and $\dot{x}, \dot{y}$ are corresponding velocity components. Simultaneous solution of equations (1), (2), and (3) yields the time to the point of probable collision (the end 7 of vector 4 in FIG. 1):

$$t_{PPC} = \frac{-x_{OT}\dot{x}_T - y_{OT}\dot{y}_T}{\dot{x}_T^2 + \dot{y}_T^2 - V_o^2}$$

$$\pm \frac{[(x_{OT}\dot{x}_T + y_{OT}\dot{y}_T)^2 - (\dot{x}_T^2 + \dot{y}_T^2 - V_o^2)(y_{OT}^2 + x_{OT}^2)]^{1/2}}{\dot{x}_T^2 + \dot{y}_T^2 - V_o^2}$$

$$(4)$$

The solution in equation (4) for the time $t_{PPC}$ can be substituted into equations (2) and (3) to obtain the actual $x,y$ coordinates of any actual point of probable collision. Since the usual marine radar system provides target position data in polar $\rho, \theta$ coordinates, a coordinate transformation to $x, y$ values will be required if the presentation on screen 2 is to be provided by raster scanning the cathode ray beam or if computation is performed in $x,y$ coordinates.

If the radical in equation (4) becomes imaginary; i.e., if:

$$(\dot{x}_T^2 + \dot{y}_T^2 - V_0^2)(y_{OT}^2 + x_{OT}^2) > (x_{OT}\dot{x}_T + y_{OT}\dot{y}_T)^2 \quad (5)$$

or if:

$$(\dot{x}_T x_{OT} - \dot{y}_T y_{OT})^2 > (x_{OT}^2 + y_{OT}^2) \quad (6)$$

then a collision is not possible. In such a case, the circle 6 or other figure representing uncertainty can be dropped from the display. The area of uncertainty can be enlarged to account for a desired minimum passing distance.

The size of the circular or other area of uncertainty surrounding the point 7 of probable collision can be calculated by a computer in several ways. By one method, the extreme values of $x$ and $y$ are calculated directly from equations (1), (2), and (3) by arbitrarily substituting extreme values of the estimates of $\dot{x}_T, \dot{y}_T, x_{OT}, y_{OT}$, and $V_o$. Another suitable approach is to calculate the variance of the estimates of these same variables, following the least squares fit routine and then to substitute these values of variances within equations (1), (2), and (3). The radius of the area of uncertainty can then be taken as equal to some low multiple such as two or three of the square root of the variance in $x$ and $y$.

From FIG. 2a, the distinction between the point of probable collision and the closest point of approach between the two vessels is clear. The time to closest point of approach is determined when a minimum occurs in the quantity:

$$[(x_O - x_T)^2 + (y_O - y_T)^2]^{1/2}$$

where $x_O$ is the position of own ship as a function of time along the X-axis, provided own-ship maintains present course and speed. Also, $y_O$ is the position of own ship as a function of time along the Y-axis, provided own ship maintains present course and speed. It will be assumed that the coordinate system remains fixed on the surface of the earth.

From the foregoing discussion, it is clear that a concept using the point of probable collision criterion is a much more useful concept than is the prior art closest point of approach concept in avoiding collision between vessels through adequately assessing a proposed collision avoidance maneuver. In the system of the present invention, all points of probable collision are displayed simultaneously and can be visualized as relatively fixed "obstacles" to be avoided in any selected maneuver. For example, when own ship changes heading, the time of closest point of approach changes radically and in a manner difficult to visualize. Knowing only the coordinates of the presently predicted closest point of approach does not permit the prediction of the heading or headings of own ship which may result in a collision. Conversely, a knowledge of the coordinates of a presently predicted closest point of approach does not clearly inform the ship's pilot as to heading or headings that must be avoided. The character of displays emphasizing the closest point of approach criterion is indeed such that it is possible to predict closest point of approach data corresponding to only one threat at a time.

It is evident by inspection of the foregoing analysis that solution of the equations thereby generated may be accomplished by several known methods, including the use of a cooperative assembly of known analog or known digital data processing or computing circuits. For example, the several equations involve simple arithmetic operations such as addition, subtraction, multiplication, squaring, and extraction of square roots. Many examples of both analog and digital computer elements are available in the prior art for accomplishing such computations and it is well known that they may readily be coupled together in cooperative relation for attaining desired results. It is furthermore evident that a conventional general purpose digital or analog computer may be employed for the purpose. It is obviously well within the ordinary skill of digital computer programmers to process the equations discussed above, to create flow charts, and to translate the latter into computer routines and sub-routines for solution of such equations along with a compatible computer language for processing input data and instructions to produce outputs directly useful for application in a standard cathode ray tube display.

FIG. 3 represents one possible instrumentation for practising the invention and incorporating the novel maneuver assessment display 20. As previously indicated, the system uses data derived, for example, by a conventional azimuth scanning pulse radar system 21 of the type widely used in marine radar applications and employing a directive azimuth-scanning antenna 21a. In the invention, the radar antenna azimuth or bearing data and detected target range data may be used to generate in a conventional way, a type P or plan position presentation on the screen of display 22. Thus, when the display is an off-set type P display, all targets in the vicinity of radar 21 are periodically intensified on the screen of display 22. Target 22a represents one such target, while the location of own ship is represented at 1. Additional targets will generally appear on display 22, along with reflections from fixed obstacles including land masses, if present. Variants of the regular type P display may be used, such as an off-set type P display and others. Further, certain characteristics of images such as that of target 22a may be modified to enhance rapid recognition of those representing dangerous targets, as is customarily done in collision warning displays using the tau criterion principles which provide displays improving the operator's ability to discriminate between real and potential threats and non-threats. However, the simple type P display is by inherent nature a collision warning display and so it is placed in FIG. 3 as representative of collision warning or collision assessment displays in general.

As noted, several targets will often appear on display 22, each having a greater or lesser hazard characteristic with respect to own ship 1. The operator of own ship 1 may select the apparently most dangerous intruding target for first investigation, entering it into the maneuver assessment system yet to be described.

Entry of the coordinates of the selected target is accomplished by placing a conventional light-sensitive pick up 23 or "light-pen" or other transducer over the location of the selected target image. Such a pick up device is illustrated in use in the Frank Pat. No. 3,182,320, issued May 4, 1965, and covering an "Automatic Range and Azimuth Track While Scan System." At the time that the target image is next intensified, an electrical pulse is transmitted via lead 24 to track-while-scan system 25, which system also receives synchronizing and other signals via lead 26 from radar unit 21.

Track-while-scan system 25, like radar unit 21, is not necessarily a novel part of the system, as suitable devices for practising its function are present in the prior art. Track-while-scan systems are of the general class of devices known as devices for tracking grouped or periodically interrupted data and their theoretical basis is explained by W. B. Jones and R. I. Hulsizer in Section 9.8 (page 378 et seq.) of Volume 20 of the Radiation Laboratory Series: *Electronic Time Measurements*. Practical forms of these devices, which may be analog or digital in instrumentation, are described in several U.S. patents such as, for example, in the White U.S. Pat. No. 2,849,707 for a "Position Correcting Means for Track-While-Scan Channels," issued Aug. 26, 1958; in the Coveley U.S. Pat. No. 2,944,253 for a "Radar System and Display," issued July 5, 1960; in the Close U.S. Pat. No. 3,064,250 for an "Automatic Track-While Scan Channel," issued Nov. 13, 1962, and elsewhere.

According to prior practice, such devices as optical pick up 23 have been used to enter coordinate data characterizing a selected target appearing on a type P or other cathode ray indicator 22 into storage in a track-while-scan device, such as apparatus 25, where its rectangular or polar coordinates may be stored. Automatic lock-on in the conventional manner by apparatus 25 to signals received directly via conductor 26 from the receiver of radar 21 at the time the antenna 21a next sweeps past the selected target automatically corrects the stored positional data of the selected target after its initial entry until the operation is manually disabled. Thus, for example, coordinates $x$ and $y$ and rates $\dot{x}$ and $\dot{y}$ may be stored for any such target. Entry of a new or next apparently dangerous target generates a second set of $x,y,\dot{x}$, and $\dot{y}$ data for storage within track-while-scan apparatus 25 for the newly selected target. Such stored $x,y,\dot{x}$, and $\dot{y}$ data may be stored at the will of the operator in this manner for a plurality of intruding vessels for supply, upon demand, as on a time shared basis, via conductors 27 to computer 28. As previously noted, track-while-scan apparatus 25 may be either of analog or digital nature and may be supplied, if required, in a conventional manner by suitable analog-to-digital or digital-to-analog converters as interface elements between various components of the system such as apparatus 25 and computer 28. It will be understood that track-while-scan apparatus 25 is actually a type of computer device in itself, performing arithmetic functions such as differentiation, and storing data. It will therefore be understood that its function may be performed either in a discrete unit, such as in the separate apparatus 25, or that its arithmetic and storage operations may be performed by respective arithmetic and storage elements present in computer 28. The latter elements may perform other system functions in a conventional manner on a time sharing basis.

Referring again to FIG. 1, it will be seen that computer 28 has several computations to perform in generating the maneuver assessment symbols on the indicator 20 of FIG. 3. It will be demonstrated how the system is constructed and how it operates to generate one such symbol such as the symbol including symbol elements 4, 5, 6, and 7 shown in FIG. 1. It will be appreciated that the stored $x$ and $y$ coordinates of the various targets are readily available in the track-while-scan unit 25. Since the motions of each of the ships in the vicinity of own ship are relatively slow compared to the speeds of even the simplest computers, it is seen that it is not necessary to compute all of the data in real time and, consequently, the threat or hazard data is conveniently stored and up-dated only periodically by track-while-scan system 25. Thus, there will be little difference between the actual $x$ and $y$ coordinates of a particular target and the corresponding stored $x$ and $y$ coordinates derived by computer 28 from track-while-scan system 25. It will also be understood that a plurality of symbols such as that made up of elements 4,5,6, and 7 of FIG. 1 may readily be generated on a time sharing or multiplexing basis using simple time sharing techniques well known in the analog and digital computer arts.

Referring now particularly to the apparatus for generating a composite symbol made up of elements 4,5,6, and 7, it is apparent that the $x$ and $y$ coordinates of the point 5 in FIG. 1 substantially represent the present rectangular coordinates of a target or hazard vessel. In the following, it will be understood that the discussion of the location 5 and of the coordinate characteristics of other elements of the symbol could equally well be discussed in the same manner if polar $\rho$, $\theta$ coordinates were in actual use in the system under discussion. Computer 28 may be supplied with a self-contained clock or timing system which dominates the operation of other elements of the system, or it may be under the control of a separate timer 29. For example, timer 29 may be synchronized using lead 30 to a clock internal of computer 28. On the other hand, timer 29 may represent the major system clock, determining the timing of computer 28 by the agency of signals transmitted to it via electrical lead 30. In what follows, the timer 29 will, as a matter of convenience, be spoken of as the basic timer or clock control for the system.

It is apparent that computer 28 may be programmed so as periodically to derive, from track-while-scan system 25, the $x$ and $y$ coordinates of location 5 shown in FIG. 1, and to supply by well known means coordinate values as control signals to display 20 and thus to cause the cathode ray beam to be instantaneously intensified so as to form a bright spot at point 5 on display 20.

The next function of the computer 28 is to cooperate with the line symbol generator 31 in forming the predicted track 4 of FIG. 1. As is seen from the foregoing theoretical analysis, the track 4 is drawn from target present position to a predicted point 7 of probable collision determined by the relative bearing of the target vessel and its speed. Computer 28 applies via lead 32 $x$ and $y$ coordinates of point 5 to the line symbol generator 31, and also supplies via leads 33 $x$ and $y$ coordinates of the predicted point 7, having used the $x,y,\dot{x},$ and $\dot{y}$ information generated by track-while-scan system 25 to generate such values. Line symbol generator 31 may then supply, substantially instantaneously following the intensification of point 5, component sweep voltages via leads 34 and 34a for generating line 4. Apparatus suitable for performing the function of line symbol generator 31, both in analog and digital forms, is well known in the art. Both in the patent and other literature, there appears a substantial number of disclosures showing means for the generation, for instance, on a cathode ray tube screen, of a line of adjustable length, starting at any selected coordinate location on the cathode ray tube screen and ending at any other coordinate location on the cathode ray screen, and therefore lying at any arbitrary angle with respect to the operating coordinate system.

A simple arrangement which may be adapted to forming the target future track line 4 appears, for example, in the J. E. Shepherd et al. U.S. Pat. No. 2,406,858 for a "Visual Position and Phase Sense Indicator," issued Sept. 3, 1946 and assigned to the Sperry Rand Corporation. The art of drawing vectorial lines is a highly exploited cathode ray tube art in the field of character displays. For example, many such character display circuits employ symbol generators in which the sweeping of the cathode ray beam in a repetitive organized pattern is not employed. On the other hand, the method employed in such alphanumeric symbol generators is that of assembling the symbol by a concatenation of successive electron beam traces. Each succeeding trace generally begins at the point defined by the end of the immediately preceding trace. It will be apparent that in drawing usual alphanumeric symbols, the successive traces are generally vectored at changing angles. It is apparent that each such elemental trace is generated by apparatus which starts the trace at an arbitrary location on the cathode ray tube and ends the trace at another arbitrary location. Examples of such systems are found in the Bacon U.S. Pat. No. 3,325,802 for a "Complex Pattern Generation Apparatus," issued June 13, 1967; in the Dye U.S. Pat. No. 3,394,367 for a "Symbol Generator," issued July 23, 1968; in the Townsend U.S. Pat. No. 3,289,195, for a "Delay Line Wave Shape Generator," issued Nov. 29, 1966, and elsewhere.

Accordingly, the vector 4, representing the predicted trajectory of the target vessel has been drawn between the points 5 and 7, which point 7 has been defined in the foregoing as the point of probable collision. The $x$ and $y$ coordinates of location 7 remain available in a computer 28 and are now used in generating a boundary 6 of a region representing a region of possible collision surrounding the point of probable collision 7. At the instant at which the trajectory line 4 is being drawn, the coordinates of point 7 are made available within computer 28. Accordingly, if the region of possible collision 6 is to be indicated as bounded by a circle surrounding point 7, computer 28 establishes the size of that uncertainty region by computing, for example, a radius for circle 6. Computer 28 then supplies $x$ and $y$ coordinates of point 7 to the circle symbol generator 35 via leads 36 and 37. The deflection voltages for a circle of appropriate size are supplied via leads 38 and 38a in a conventional manner in indicator 20 to produce the circle 6. The size of circle 6 may be increased by an incremental safety factor by manipulation of control 35a.

Circle symbol generators suitable for application in apparatus 35 are well known in the art. In fact, this particular alphanumeric symbol is the easiest and most commonly generated symbol in prior art character generation equipment. Apparatus for drawing a circle about any desired point on a cathode ray tube screen is thus well known. For example, an equipment adaptable for this purpose is illustrated in the Courter U.S. Pat. No. 3,283,317 for "Symbol Generators," issued Nov. 1, 1966 and assigned to the Sperry Rand Corporation. The Courter patent makes it clear how characters and symbols can be generated using cooperating circuits for generating whole or partial circles by the use of sine waves and rectified components thereof. Other arrangements suitable for application in the present invention include those of the Uphoff U.S. Pat. No. 3,164,822 for a "Diode Wave Form Generator for Symbol Generation During the Retrace Interval of a Cathode Ray Tube," issued Jan. 5, 1965, and U.S. Pat. No. 3,164,823 for a "Symbol Generating System for CRT Displays Employing Retrace Insertion," issued Jan. 5, 1965, both being assigned to the United States Government. Other patents illustrate arrangements for generating circular symbols that may readily be applied in the present system.

It is apparent that the line trace 4 and the circular symbol 6 may be drawn simultaneously or nearly so, as desired. A dual gun cathode ray tube employing corresponding sets of electrostatic deflection electrodes for each electron beam permits drawing the line with one gun-beam deflection system and the circle with the second gun-beam deflection system. Single gun operation with a single deflection system may be used, for example, with the line being traced instantaneously prior to the tracing of the circle.

The display 20 may employ an ordinary type of cathode ray tube in which the decay period of the phosphor on the display screen is selected so that a symbol traced in the past has substantially faded by the time that computer 28 calls for upgrading of the display. Regular or random erasure of the display may also be accomplished under control of computer 28 when a conventional direct viewing storage type of cathode ray display is employed. Such erasure may also be accomplished as in the past at any time desired by the observer.

Variations of the system illustrated in FIG. 3 are readily apparent that may lend even greater versatility to the maneuver assessment display system. It is seen that the optical pick off 23, or a similar device, may be used to pick off coordinate data from the display of a long range or early warning radar system or from a sonar display or other proximity warning display or device. By means of the track-while-scan system 25, the operator may cause the system to lock on to and to track any selected hazard detected by any available sensor. The relative bearings and ranges of the targets locked into the automatic tracking operation are readily available in upgraded form for manipulation by computer 28 for generating data required of symbol generators 31 and 35 for producing display 20.

The data, while present in the computer 28, may be manipulated or refined by the use of inertial stabilizing information such as generated by gyrocompass 40 or ship's speed sensor 41. In this manner, the threat bearing may be corrected for own ship's roll, pitch, or yaw motions in a conventional manner as a refinement of the invention. Alternatively, the data generated by the radar system may be provided with inherent stabilization features by the direct servo stabilization of antenna scanner 21a. Functions not directly related to the collision avoidance and maneuver assessment functions may also be performed by computer 28 on a time sharing basis, such as inertial navigational functions and the like.

While the invention has been described in its preferred embodiment, it is to be understood that the words that have been used are words of description rather than limitation and that changes within the purview of the appended claims may be made without departing from the true scope and spirit of the invention in its broader aspects.

I claim

1. Apparatus for providing a maneuver assessment display for mobile vehicles comprising:
   sensor means for generating coordinate and velocity component data of a first vehicle with respect to a second vehicle,
   computing means responsive to said coordinate and velocity component data for computing a predicted track for said first vehicle to a point of probable collision with said second vehicle and a region about said point of probable collision representing a region of possible collision, and
   display means for displaying said predicted track and said region relative to each other.

2. Apparatus as described in claim 1 wherein said sensor means comprises:
   azimuth scanning radar means for detecting coordinate data of said first vehicle with respect to said second vehicle,
   intermediate display means for displaying an image representing said first vehicle,
   transducer means for generating an electrical impulse upon intensification of said image on said intermediate display, and
   means responsive to said impulse for automatically tracking and storing coordinate and velocity component data characterizing said first vehicle.

3. Apparatus as described in claim 1 wherein said computing means comprises digital computer means programmed to compute the terminal points of a said predicted track of said first vehicle.

4. Apparatus as described in claim 3 wherein said digital computer means is programmed to calculate a dimension defining a region surrounding said point of probable collision representative of a region of possible collision.

5. Apparatus as described in claim 4 wherein said means for display comprises:
   line symbol generator means under control of said digital computer means and having first output means,
   circle symbol generator means under control of said digital computer means and having second output means,
   cathode ray tube indicator means,
   timing means for controlling said line symbol generator and said circle symbol generator, and
   means coupling said first and said second output means to said cathode ray tube indicator means for displaying said predicted track and said region.

6. Apparatus for providing a maneuver assessment display for mobile vehicles comprising:
   sensor means for periodically detecting sets of coordinate data of a first vehicle with respect to a second vehicle,
   means for storing at selected times sets of said coordinate data,
   means for calculating velocity components of said first vehicle from said stored sets of coordinate data and for storing same,
   output means adapted to supply the most recently stored of said sets of coordinate data and the most recently computed of said velocity component data,
   means coupled to said output means for computing a predicted track for said first vehicle to a point of probable collision with said second vehicle and a region about said point of probable collision representing a region of possible collision, and
   means for displaying said predicted track and said region with respect to each other.

7. A display system for providing a maneuver assessment display for representing first and second mobile vehicles characterized by parameters:
   $x_{OT}$, $y_{OT}$ representing a first set of position coordinates of said first vehicle,
   $x_T$, $y_T$ representing a second set of position coordinates of said first vehicle at the time $t_{PPC}$ of probable collision between said first and second vehicles,
   $\dot{x}_T$, $\dot{y}_T$ representing velocity components of said first vehicle at time $t_{PPC}$, and
   $V_0$ representing the speed of said second vehicle, comprising: computer means responsive to the application of measured values of said parameters $x_{OT}$, $y_{OT}$, $\dot{x}_T$, $\dot{y}_T$, and $V_0$ for solving a value of the said parameter $t_{PPC}$ using the equation:

$$t_{PPC} = \frac{-x_{OT}\dot{x}_T - y_{OT}\dot{y}_T}{\dot{x}_T^2 + \dot{y}_T^2 - V_0^2}$$
$$\pm \frac{[(x_{OT}\dot{x}_T + y_{OT}\dot{y}_T)^2 - (\dot{x}_T^2 + \dot{y}_T^2 - V_0^2)(y_{OT}^2 + x_{OT}^2)]^{1/2}}{\dot{x}_T^2 + \dot{y}_T^2 - V_0^2}$$

and then by solving equation:
$x_T = x_{OT} + \dot{x}_T t$
and equation:
$y_T = y_{OT} + \dot{y}_T t$
by substituting said value of parameter $t_{PPC}$ therein, and
display means coupled to said computer means for automatically displaying a line between locations on said display corresponding to the parameters $x_{OT}$, $y_{OT}$ and $x_T$, $y_T$, where the location $x_T$, $y_T$ defines the location of probable collision between said first and second vehicles.

8. Apparatus as described in claim 7 wherein:
   said computer means responsive to the values of said parameters computes the uncertainty of the location of the point of probable collision between said first and second vehicles, and said display means utilizes said uncertainty data to draw a boundary surrounding location $x_T$, $y_T$ defining a region of possible collision between said first and second vehicles.

* * * * *